US008977568B1

(12) United States Patent
Schattauer et al.

(10) Patent No.: US 8,977,568 B1
(45) Date of Patent: Mar. 10, 2015

(54) ANONYMOUS MOBILE PAYMENTS

(71) Applicant: Amazon Technologies, Inc., Reno, NV (US)

(72) Inventors: Paul C. Schattauer, Seattle, WA (US); Derek Edward Wegner, Vashon Island, WA (US); Diwakar Gupta, Seattle, WA (US); Chih-Jen Huang, Issaquah, WA (US); Philip Yuen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/801,706

(22) Filed: Mar. 13, 2013

Related U.S. Application Data

(62) Division of application No. 12/422,404, filed on Apr. 13, 2009, now Pat. No. 8,423,457.

(51) Int. Cl.
G06Q 20/38 (2012.01)

(52) U.S. Cl.
CPC .................................. G06Q 20/383 (2013.01)
USPC .............. 705/39; 705/16; 705/26.41; 705/30; 705/40; 705/44; 705/64; 705/75; 705/78; 713/168

(58) Field of Classification Search
None
See application file for complete search history.

(56) References Cited

U.S. PATENT DOCUMENTS

| 5,524,073 | A  | * | 6/1996  | Stambler  | 705/75 |
|-----------|----|---|---------|-----------|--------|
| 6,311,170 | B1 |   | 10/2001 | Embrey    |        |
| 2001/0044787 | A1 | * | 11/2001 | Shwartz et al. | 705/78 |
| 2002/0026412 | A1 | * | 2/2002 | Kabin | 705/39 |
| 2002/0032650 | A1 | * | 3/2002 | Hauser et al. | 705/40 |
| 2002/0073027 | A1 |   | 6/2002 | Hui et al. | |
| 2002/0120846 | A1 | * | 8/2002 | Stewart et al. | 713/168 |
| 2003/0120608 | A1 |   | 6/2003 | Pereyra | |
| 2005/0080634 | A1 |   | 4/2005 | Kanniainen et al. | |
| 2005/0154671 | A1 |   | 7/2005 | Doan et al. | |
| 2005/0289080 | A1 | * | 12/2005 | Rhiando | 705/64 |
| 2006/0247982 | A1 |   | 11/2006 | Stolfo et al. | |
| 2008/0052227 | A1 |   | 2/2008 | Canard et al. | |
| 2008/0154772 | A1 | * | 6/2008 | Carlson | 705/44 |

(Continued)

FOREIGN PATENT DOCUMENTS

WO        WO91/09370         6/1991

OTHER PUBLICATIONS

U.S. Appl. No. 12/422,404, filed Apr. 13, 2009, Paul C. Schattauer et al., "Anonymous Mobile Payments".

(Continued)

Primary Examiner — Robert R Niquette
(74) Attorney, Agent, or Firm — Lee & Hayes, PLLC

(57) ABSTRACT

Anonymous mobile payments enable a user to make and/or receive payments without disclosing personal or private information to another party. In some aspects, a provider of a payment may request an anonymous payment for a specified value from a host. In response, the host may transmit to the provider a code that is available for redemption. The provider may then relay the code to a recipient, who may redeem the code from the host. In other aspects, a recipient may request a temporary identifier (special code) from a host. The recipient may relay the temporary identifier to a provider, who may in turn transmit a payment, via the host, using the temporary identifier. The recipient may then claim the payment from the host. In additional aspects, the codes of the anonymous payments may include expiration times and/or restrictions on a number of uses of the code.

20 Claims, 12 Drawing Sheets

(56) References Cited

U.S. PATENT DOCUMENTS

| | | |
|---|---|---|
| 2008/0172306 A1 | 7/2008 | Schorr et al. |
| 2008/0288351 A1 | 11/2008 | Leung et al. |
| 2008/0313061 A1* | 12/2008 | Eugenio Donato Renato Limlengco ............... 705/30 |
| 2009/0037285 A1* | 2/2009 | Murphy .................. 705/16 |
| 2009/0171837 A1 | 7/2009 | Moreno |
| 2010/0036767 A1* | 2/2010 | Sharoff et al. ............. 705/39 |
| 2011/0066524 A1* | 3/2011 | Bottner et al. .......... 705/26.41 |

OTHER PUBLICATIONS

Non-Final Office Action for U.S. Appl. No. 12/422,404, mailed on Dec. 29, 2011, Paul C. Schattauer et al., "Anonymous Mobile Payments", 10 pages.

Non-Final Office Action for U.S. Appl. No. 12/422,404, mailed on Apr. 5, 2012, Paul C. Schattauer et al., "Anonymous Mobile Payments", 12 pages.

Final Office Action for U.S. Appl. No. 12/422,404, mailed on Aug. 21, 2012, Paul C. Schattauer et al., "Anonymous Mobile Payments", 14 pages.

\* cited by examiner

ANONYMOUS MOBILE PAYMENTS

CROSS-REFERENCE TO RELATED APPLICATIONS

This application is a divisional of and claims priority from U.S. patent application Ser. No. 12/422,404, filed on Apr. 13, 2009, and entitled "Anonymous Mobile Payments", which is hereby incorporated by reference in its entirety.

BACKGROUND

Traditional methods of conducting financial transactions commonly consist of an exchange of currency using paper currency, checks, credit cards, and electronic transfers via a financial institution. In more recent years, an ever increasing amount of financial transactions occur electronically and do not require direct contact with a financial institution. Some transactions occur over computer networks, such as the Internet, while other transactions occur using telephone-based systems.

It is commonplace for entities to conduct an electronic payment to complete a transaction. In a typical transaction, information about each party is typically exchanged to facilitate the electronic transaction. Some of this information may be personal or private information that a person may not desire to share with a stranger. For example, a customer may have to provide their address and telephone number during execution of an electronic payment.

Information privacy is a large concern for many people. Often, people take measures to protect their private information to avoid identity fraud, harassment, or other undesirable acts. These acts may occur when another person obtains private or personal information about another and uses it in a fraudulent or malicious act.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems for providing anonymous mobile payments that may enable a user to enter into transactions with another user without disclosing personal and/or private information to the other user, such as a name, a telephone number, an email, and/or other personal or private information. Thus, the techniques and systems provide a safe and reliable mechanism for user to make payments or receive payments while maintaining their anonymity. The anonymous mobile payment may be initiated by either a provider of a payment or a recipient of the payment. In some instances, the recipient may not have a mobile payment account, and thus the anonymous mobile payment transaction may include a registration process to enable transfer of the payment from the provider to the recipient. As used herein, the term "payment" includes a transfer money, credits, points, shares, elements (e.g., products/services), or any other medium that may be transacted. The techniques and systems described herein may be implemented in a number of ways. Example implementations are provided below with reference to the following figures.

Illustrative Computing Environment

Figure 1:
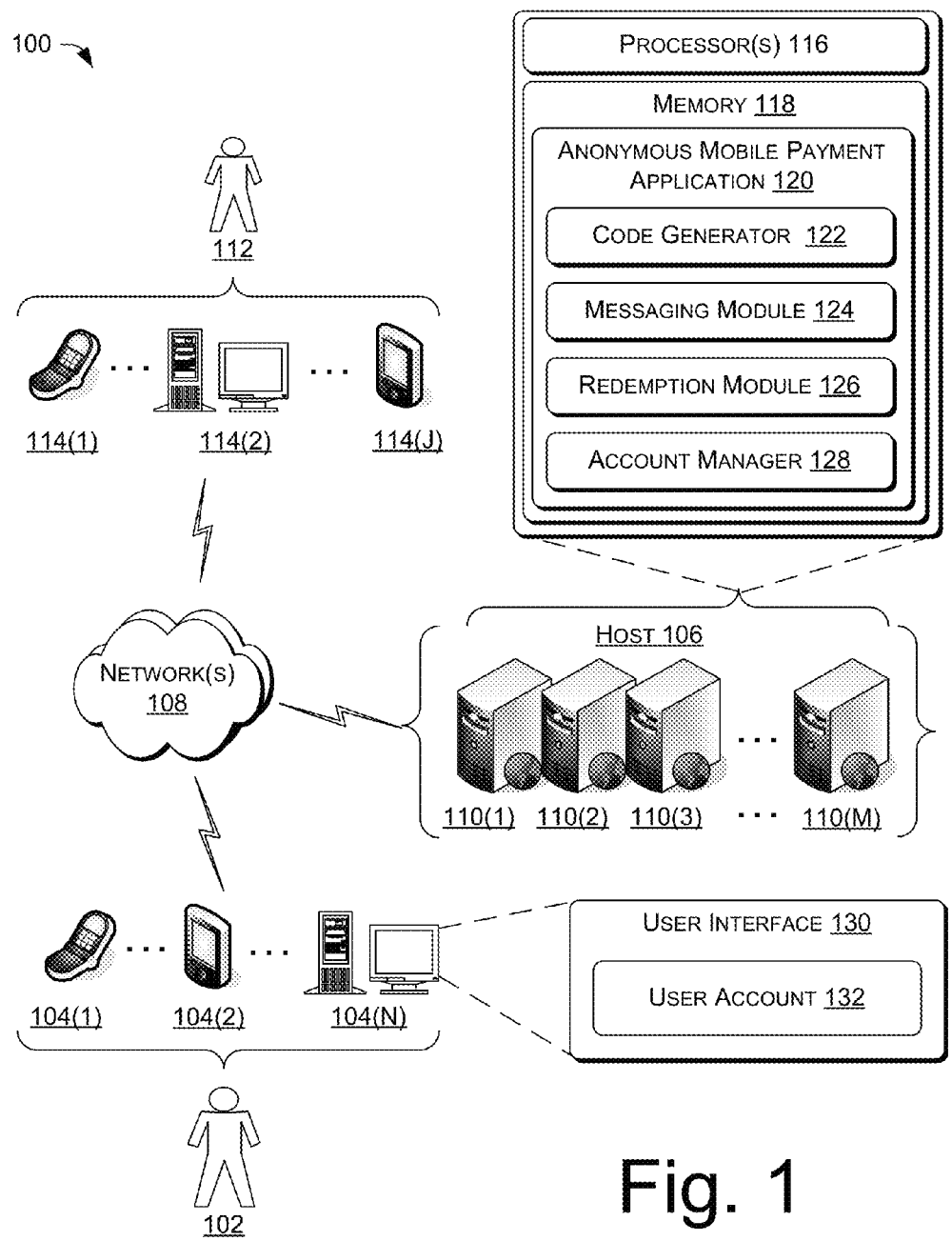
FIG. 1 is a schematic diagram of an illustrative computing environment usable to provide anonymous mobile payments.

FIG. 1 is a schematic diagram of an illustrative computing environment 100 for providing anonymous mobile payments. A user 102 is associated with one or more client computing devices ("client devices") 104(1), . . . , 104(N) that access a host 106 via a network 108. The network 108 is representative of many different types of networks, such as cable networks, the Internet, local area networks, mobile telephone networks, wide area networks and wireless networks, or a combination of such networks.

The host 106 may comprise one or more servers 110(1), . . . , 110(M), perhaps arranged as a server farm. Other server architectures may also be used to implement the host 106. The host 106 is capable of handling requests from one or more users and serving, in response, various information and data to the client devices 104(1)-(N). The servers 110(1)-(M) include mobile payment servers capable of facilitating interaction by the client devices 104(1)-(N) between the user 102 and a user account via the network 108. In this manner, the host 106 is representative of any host supporting user interaction with a payment service, including, for example, mobile payment services, online ecommerce payment services, and so forth.

The client devices 104(1)-(N) may be implemented in any number of ways. In FIG. 1, the devices are illustrated as a wireless telephone 104(1), a portable digital assistant (PDA) 104(2), and a personal computer 104(N). But, other example implementations include a television set-top box, a game console, a portable gaming device, a digital video recorder, a portable computer, electronic book readers, netbooks, and other electronic or entertainment devices.

The user employs the client device 104(1)-(N) to interact with the user account residing on the host 106. In one scenario, the client device 104(1)-(N) sends a request to the servers 110(1)-(M). The request may be a uniform resource identifier (URI) request, a short message service (SMS) message, a multimedia messaging service (MMS) message, mobile instant messaging (MIM), e-mail, or other type of request. Upon receiving the request, the servers 110(1)-(M) may return a message (or page, other communication, etc.) to the requesting client device 104(1)-(N), allowing the user to interact with the data provided by the servers 110(1)-(M). For example, a returned message may include information to enable the user 102 to engage in an anonymous payment transaction with an entity 112. The entity 112 may be a person, as illustrated in FIG. 1, or it could be a business, organization, and so forth. The entity 112 may be associated with entity computing devices 114(1), . . . , 114(J) to enable interaction with the host 106 and/or the user 102 via the network 108.

User interfaces, such as dedicated applications implemented using software instructions and stored locally on, or remotely to, the client device 104(1)-(N), may be used to interact with the host 106. Further, the client device 104(1)-(N) may use short text commands, such as short message service (SMS) text messages to communicate with the host 106 to initiate or conduct anonymous mobile payments.

As illustrated, the servers 110(1)-(M) are equipped with one or more processors 116 and memory 118. The memory 118 may include applications, modules, and/or data. In some embodiments, the memory 118 may include an anonymous mobile payment application 120, which may facilitate anonymous mobile payments while protecting private information of the user 102 and/or the entity 112, such as, without limitation, a name, a phone number, an address and/or an email address. In some embodiments, the mobile messaging application 120 may enable the user 102 to make a payment using a redeemable code a provider (user sending the payment) may give to a recipient. In one or more embodiments, the anonymous mobile payment application 120 may enable the recipient to create a temporary identifier (e.g., alias, address, etc.) that the provider may use when transmitting a payment to the recipient, where the temporary identifier does not include personal information of the recipient. As discussed herein, a payment may include a transfer of money, credits, points, shares, elements (e.g., products/services), or any other medium that may be transacted.

The anonymous mobile payment application 120 may include a number of modules such as a code generator 122, a messaging module 124, a redemption module 126, and an account module 128. In some embodiments, the code generator 122 may be used to create a code that can be passed to a recipient to redeem a payment, create a temporary recipient identifier (e.g., alias), or to create and enforce redemption rules. The messaging module 124 may transmit payment messages, confirmations, and instructions for redemption, among other possible messaging operations. The redemption module 126 may collect payment data, validate the data, and implement security protocols that protect payments from fraud or improper redemption activities. The account manager 128 may allocate funds in the account, hold funds, and update accounts for the provider and the recipient.

In accordance with one or more embodiments, a client device, such as the client device 104(N), may be equipped with a user interface (UI) 130 to provide access to a user account 132. For example, the user 102 may communicate with the host 106 via the user interface 130 on the client device 104(1)-(N) to interact with the user account 132. The user account 132 may be manipulated by the user 102, either directly or indirectly, using the anonymous mobile payment application 120.

Illustrative Mobile Payments

Figure 2:
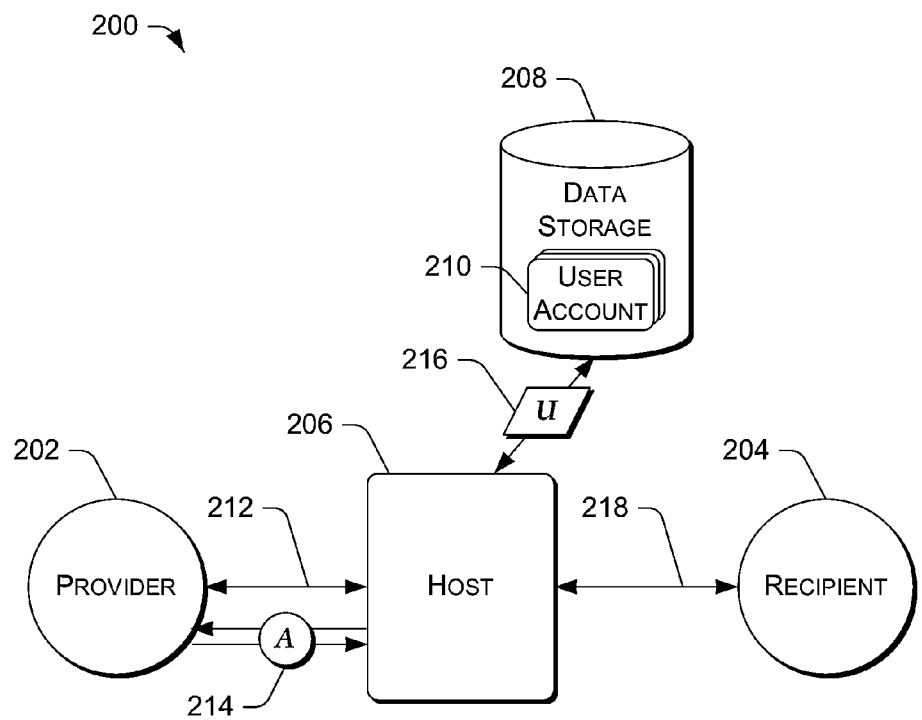
FIG. 2 is a schematic diagram of an illustrative mobile payment service including messaging between a provider and a recipient.

FIG. 2 is a schematic diagram of an illustrative mobile payment service 200 including messaging between a provider and a recipient in accordance with some embodiments of the disclosure. The service 200 may facilitate messaging and payments between a provider 202 and a recipient 204 via a host 206. The provider 202 may provide a payment, such as money, credits, elements, etc. to the recipient 204 via a transaction. For example, the provider 202 may include the user 102 and client devices 104(1)-(N) of FIG. 1, while the recipient 204 may include the entity 112 and the computing devices 114(1)-(J), or vice versa. The host 206 may be in communication with a data storage 208, which may be used to maintain user accounts 210, such as the user account 132. In some embodiments, the user account 210 may be a transaction authorization service account as disclosed in U.S. patent application Ser. No. 11/546,534 entitled "Transaction Authorization Service" filed on Oct. 10, 2006. Alternatively or additionally, the user account 210 may be a bank account (e.g., checking or savings account), a credit card account, another financial services account, or other type of account configured to manage payments as discussed herein.

In accordance with some embodiments, the provider 202 may transmit a provider message 212 to the host 206. The provider message 212 may originate from a web-interface communication, an email, a telephone service, a short message service (SMS) text message, a multimedia message service (MMS) message, a mobile instant messaging (MIM), or another communication.

For example, SMS text commands may be established to enable the provider 202 to transact a payment with the recipient 204 via the host 206. The provider 202 may send an SMS text message of "pay 20" to the host 206 for processing, where "pay 20" is the established command that indicates that the provider would like to process an anonymous payment of a payment amount of "20." In response, the host 206 may send the provider 202 a unique code, which may be communicated to the recipient without an exchange of personal information. The recipient may then redeem the unique code to receive the payment.

In another example, the recipient may request a temporary identifier from host 206. The host may transmit the recipient an available temporary identifier, which may be communicated to the provider. The provider may then use the temporary identifier (e.g., "tempname") when sending a payment, such as by a command "pay 50 tempname," where tempname is an identifier for the recipient. In this way, the recipient does not have to provide personal information to the provider in order to complete a payment transaction.

In accordance with one or more embodiments, the provider 202 and/or the recipient 204 may have accounts, such as a provider account and a recipient account, that are associated with the respective parties. The accounts may include stored information about the respective parties, such as name, alias (e.g., username, identifier, etc.), address, telephone number, email, other contact information, financial information, etc. However, in some embodiments, the recipient may not have an account, but may still desire to engage in an anonymous mobile payment. In that case, the host may request that the recipient create an account to redeem the payment. Using anonymous mobile payments, the provider 202 may make a payment to the recipient 204 without knowing any private information of the recipient (or vice versa), such as the stored information in the accounts. The techniques described herein, provide a safe and reliable mechanism for users to make payments without even knowing the identity of the other party to the transaction.

In some embodiments, the host 206 may transmit an authorization request 214 to the provider 202. For example, when the provider message 212 is initiated using an unsecure communication, such as a SMS text message, the provider message 212 may be verified by the authorization request 214. The authorization request 214 may be particularly relevant when the provider is sending a payment to a temporary identifier (alias) that was created by the recipient. The authorization request 214 may be communicated to the provider 202 by any type of communication, such as, without limitation, a voice automated message, an email, an SMS message, or any other type of communication.

The user 102 may respond to the authorization request 214 by selecting a command to indicate an approval of the provider message 212. For example, in a mobile telephone communication, an interactive automated voice system may enable the provider 202 to accept or deny the provider message 212 during the authorization request 214. In addition to authorizing the request, the user 102 may also be prompted or required to enter other information to complete the authorization, such as a personal identification number (PIN) or password, which may provide additional security and/or verify the identity of the provider 202.

The host 206 may transmit updates 216 to the data storage 208 to update the user accounts 210 or otherwise manipulate data residing in the data storage based on the content of the provider message 212. In some embodiments, the provider message 212 may include multiple pieces of information, such as without limitation, commands (pay, transfer, reserve, etc.), values, comments, media, and so forth. The host 206 may parse this information to determine a requested action from the provider 202, and then undertake the requested action by one or more of the updates 216 directed to the user accounts 210 residing in the data storage 208.

The recipient 204 may communicate with the host 206 via a recipient message 218. For example, the recipient message 218 may be used to request a temporary identifier from the host 206 for the recipient, which may then be given to the provider 202 to enable an anonymous payment to the recipient. In addition or an alternative, the recipient message may be used to transmit a payment code to the host 206 to enable the recipient 204 to redeem a payment that was created by the provider 202. The host 206 may send the recipient a confirmation in response to the recipient message 218 when the payment code is verified by the host 206, among other possible recipient communications.

Illustrative Provider Initiated Anonymous Payments

Figure 3:
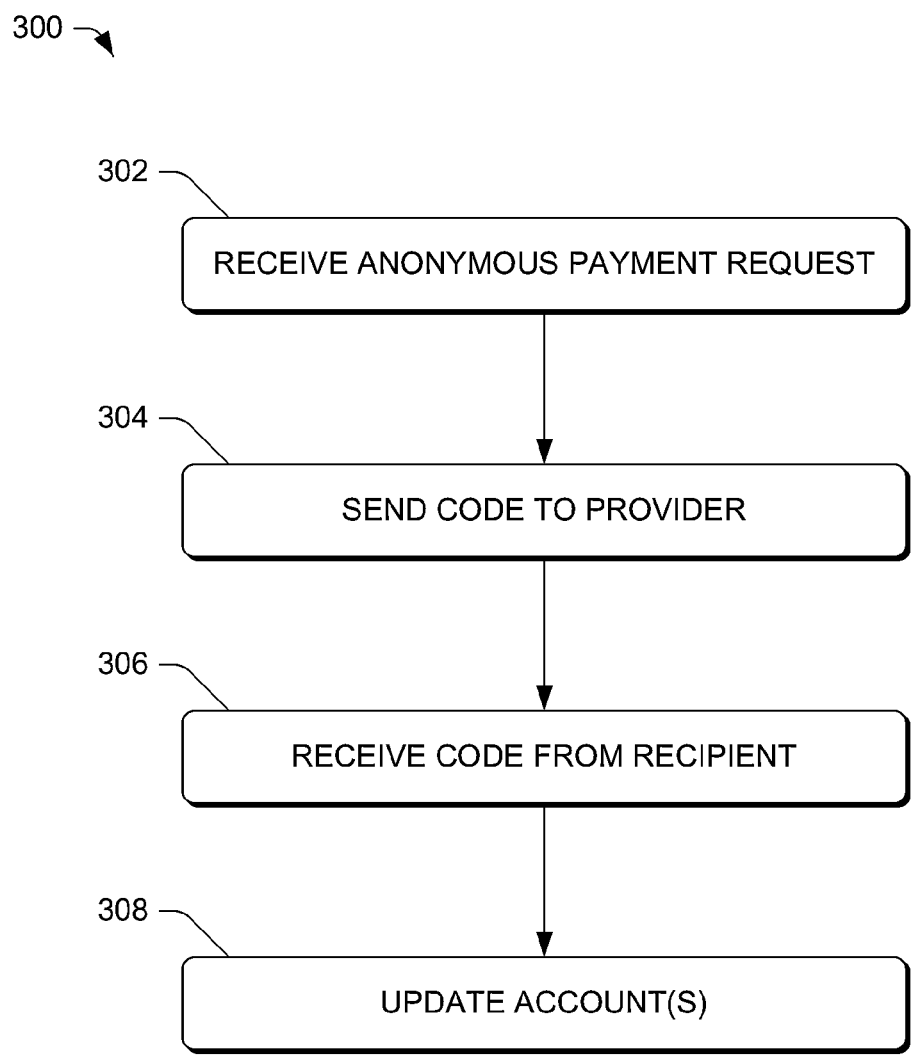
FIG. 3 is a flow diagram of an illustrative process to initiate an anonymous mobile payment from the provider.

FIG. 3 is a flow diagram of an illustrative process 300 to initiate an anonymous mobile payment from the provider in accordance with various embodiments of the disclosure. The process 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to the process 300, shall be interpreted accordingly.

At 302, the host 206 may receive an anonymous payment request from the provider 202. For example, the provider 202 may send a payment request to the host 206 via an SMS text message using a predetermine command format such as "pay 20." The host 206 may recognize this command as an anonymous payment request. Other communications between the provider 202 and the host 206 may be used to generate the anonymous payment request, such as using other messaging protocols, applications (e.g., web based, mobile phone based, etc.), and so forth.

At 304, the host 206 may send a unique code to the provider 202. In some embodiments, the code may be difficult to guess while relatively easy to remember. For example, the code may include a unique combination of words and numbers in the format "word1, word2, digit1, digit2, digit3," such as "red frog 723." However, many other codes may be generated that are difficult to guess and relatively easy for a human to remember. In another example, the unique code may include a portion of recipient information (e.g., some digits of the recipient's telephone number, zip code, etc.) that would still enable the recipient to maintain anonymity and yet be easy for the recipient to remember.

At 306, the host 206 receives the code from the recipient 204. For example, the provider 202 may verbally communicate the code to the recipient 204, who in turn may transmit the code to the host 206. In this way, the recipient 204 may receive a payment from the provider 202 without revealing personal and/or private information to the provider.

At 308, the host 206 may update accounts associated with the provider 202 and the recipient 204 to reflect the transfer of the payment in the process 300.

Figure 4:
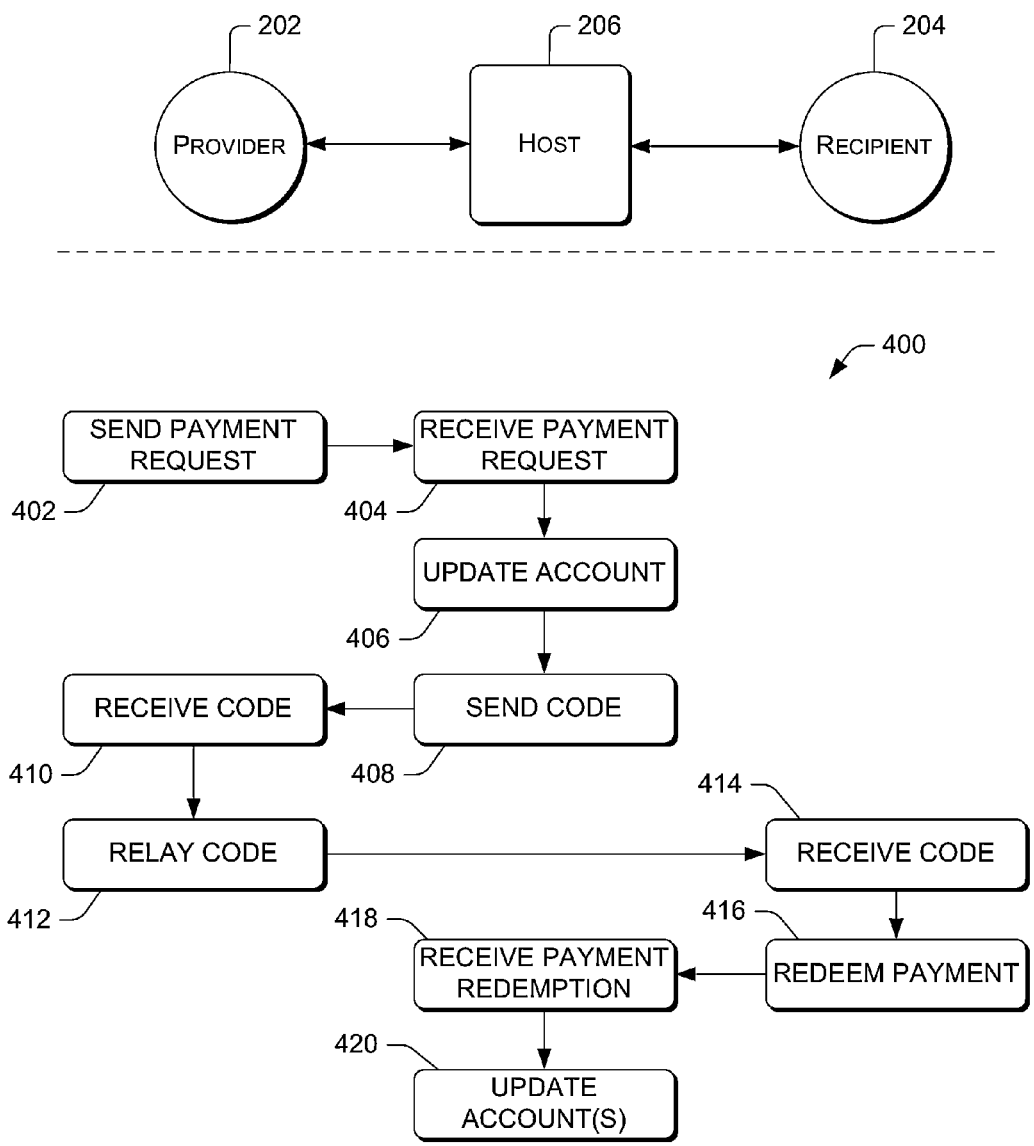
FIG. 4 is a flow diagram of an illustrative process to perform a provider initiated anonymous mobile payment.

FIG. 4 is a flow diagram of an illustrative process 400 to perform a provider initiated anonymous mobile payment in accordance with some embodiments of the disclosure. In the process 400, each operation is listed under an entity (the provider 202, the host 206, and/or the recipient 204) that is most likely to conduct the operation.

The provider 202 may send a payment request to the host 206 at 402, which is received by the host at 404. The host 206 may then update an account based on the received payment request at 406. For example, the host 206 may designate the payment amount as unavailable to the provider 202.

The host 206 may send a code to the provider 202 at 408. The provider 202 may receive the code at 410, such as via an SMS text message, at 410. Next, the provider 202 may relay the code to the recipient 204 without exchanging personal or private information at 412.

The recipient 204 may receive the code at 414. The recipient may redeem the payment at 416 by using the code, such as by transmitting an SMS text message that includes the code to the host 206. In some embodiments, the recipient 204 may transmit further data to the host 206 to facilitate obtaining the payment, which is explained in more detail below. At 418, the host 206 receives the code redemption from the recipient. Finally, at 420, the host 206 may update accounts associated with the provider 202 and the recipient 204 to reflect a transfer of a payment, as initiated in operation 402.

Figure 5:
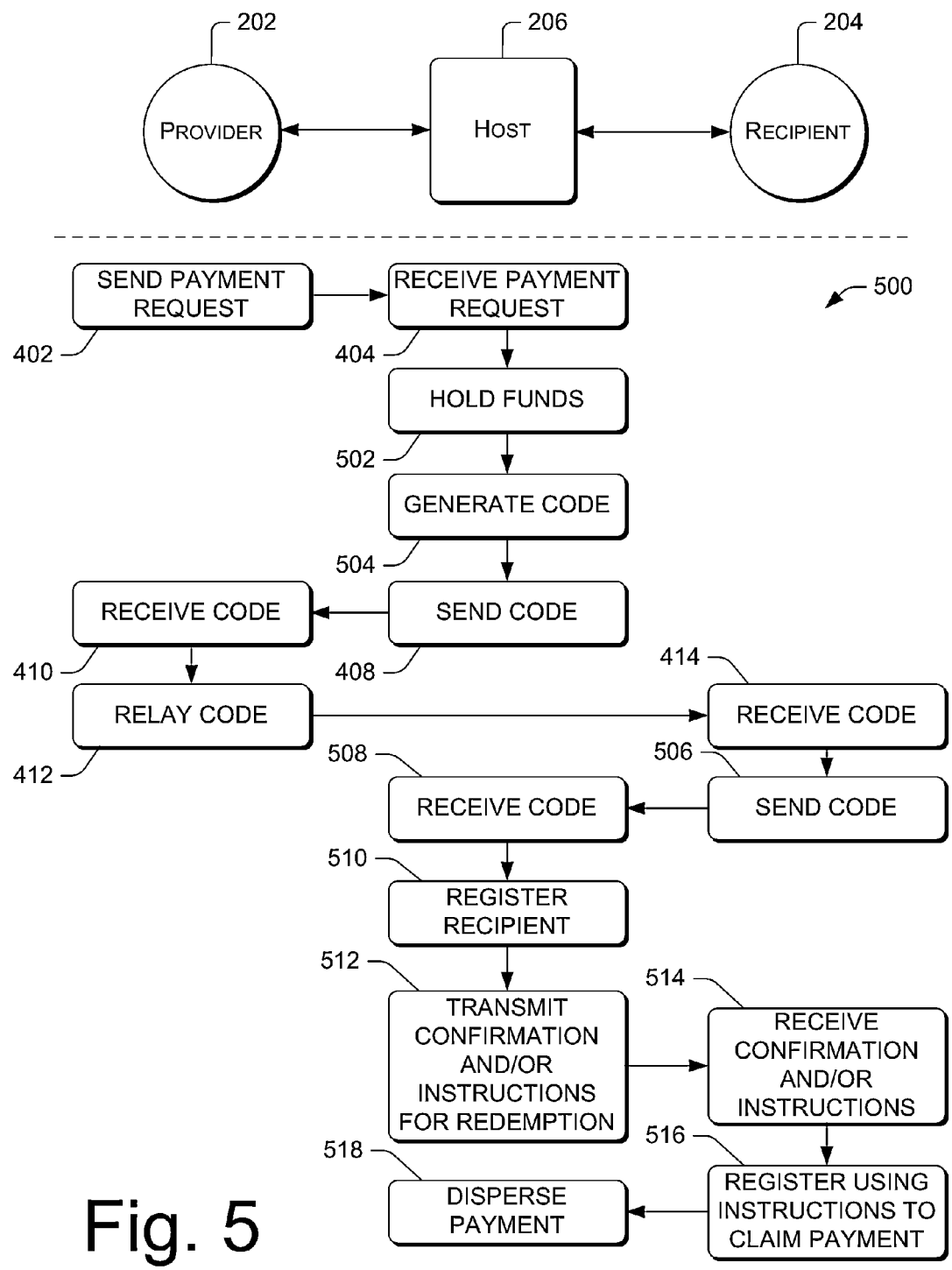
FIG. 5 is a flow diagram of another illustrative process to perform a provider initiated anonymous mobile payment.

FIG. 5 is a flow diagram of another illustrative process 500 to perform a provider initiated anonymous mobile payment in accordance with other embodiments of the disclosure. Some of the operations described in the process 400 are included in the process 500 (and shaded in FIG. 5) and may perform the same or similar operations as those described in reference to FIG. 4.

At 502, the host 206 may place an amount of funds on hold that is equal to the payment request amount. The funds may be stored in a temporary account or the account may show these funds as unavailable funds within the account. In this way, the provider 202 may be unable to use the unavailable funds or funds in the temporary account to make another payment, thus ensuring the payment amount is available to the recipient 204 until the code is redeemed or the code expires, as discussed below.

After the recipient 204 obtains the code, the recipient may transmit the code to the host 206 for redemption at 506. For example, if the code is "red frog 234," the recipient may send a message (e.g., via SMS, email, etc.) to the host 206 that includes the code "red frog 234." At 508, the host 206 receives the code. At 510, the host 206 may register the code, which may associate the code with at least one piece of user information, such as the recipient's mobile telephone number, email address, information transmitted by the recipient to the host with the code (e.g., a recipient password, etc.), or other information unique to the recipient. In addition, at 510, the payment may be disassociated from the provider 202. In some embodiments, the funds may be placed in a temporary account associated with the recipient at 510.

At 512, the host 206 may transmit a confirmation message to the recipient 204 to confirm receipt and/or validity of the code. In addition or in an alternative, the host 206 may provide instructions to the recipient at 512 that assist the recipient in receiving the payment. In some instances, the payment may be associated with the recipient via the registration at 510, but the recipient does not have payment distribution means until the host collects further information from the recipient, such as an address (e.g., for mailing a payment, etc.), a bank account (e.g., for electronic transfer of funds, etc.), or other accounts (e.g., mobile payment account, etc.) to enable receipt of the payment from the provider 202. The instructions may include, without limitation, a website address and login information for the recipient 204 to use to create the payment distribution means, such as a mobile payment account. At 514, the recipient receives a confirmation and/or instructions on how to claim the payment. At 516, the recipient 204 registers using the instructions to claim the payment. Finally, at 518, the payment is dispersed to the recipient.

In some embodiments, the process 500 may provide protections against fraud or inaccurate data transmissions to the host 206. For example, the code may act as an unrestricted payment that may be redeemed by anyone who obtains the code because the payment is transferred via the code. In some embodiments, the code may not be redeemable by some parties, such as the provider 202, or by other designated entities. For example, the provider may add a portion of the recipient's identification information (e.g., 2 digits from the telephone number, etc.), which could be verified upon the registration operation at 510. By receiving the confirmation at 512, the recipient may know that the funds have been successfully transferred from the provider to the recipient; however, further processing (e.g., registration, etc.) may be necessary for the recipient to receive the funds (e.g., registration at the operation 516).

Illustrative Recipient Initiated Anonymous Payments

Figure 6:
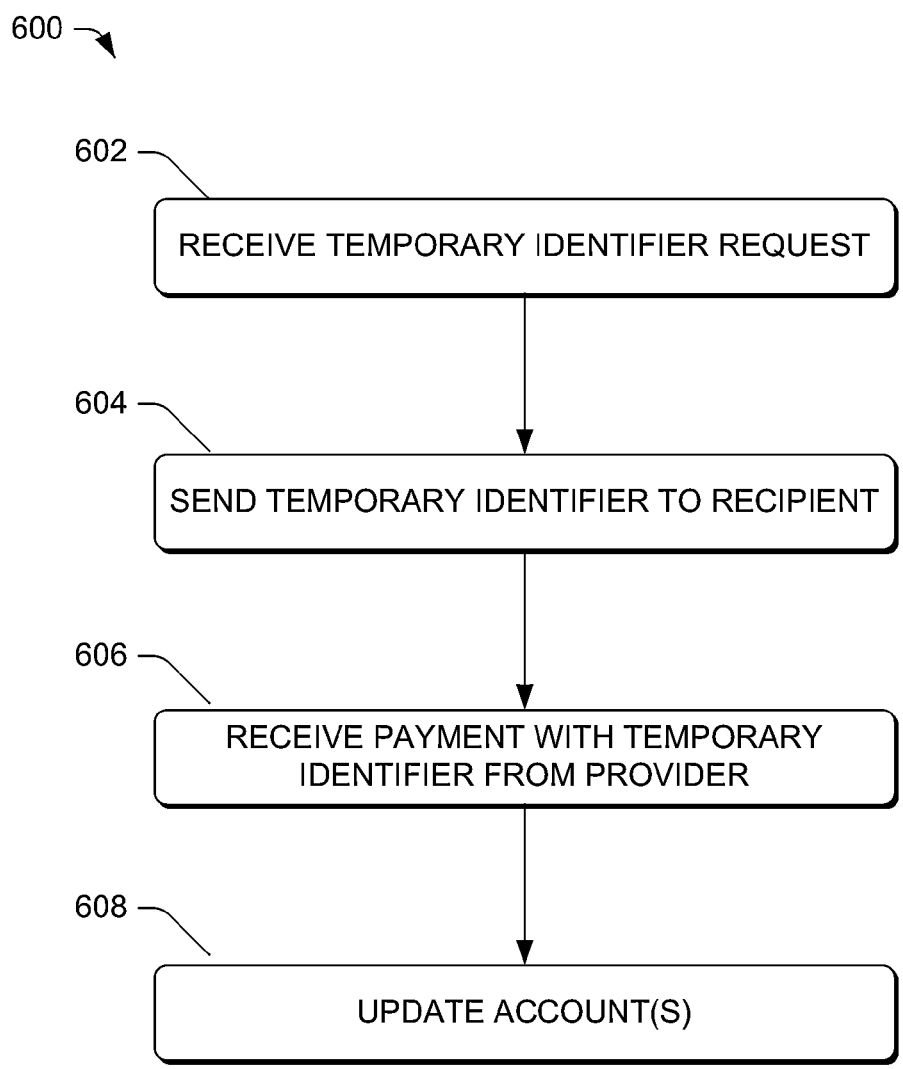
FIG. 6 is a flow diagram of an illustrative process to initiate an anonymous mobile payment from the recipient.

FIG. 6 is a flow diagram of an illustrative process 600 to initiate an anonymous mobile payment from the recipient in accordance with various embodiments of the disclosure. As discussed above, the order in which the operations are described is not intended to be construed as a limitation, and any number of the described blocks can be combined in any order and/or in parallel to implement the process.

At 602, the host 206 may receive a temporary identification/identifier (ID) request from the recipient 204. The temporary ID may act as a temporary address for the recipient 204 (e.g., an alias, username, etc.). In this way, the provider 202 can transmit a payment to the temporary ID and the recipient 204 can receive the payment without disclosing personal or private information to another party. As used herein, the temporary ID is a code with a special association to the recipient 204.

At 604, the host 206 may send a temporary ID to the recipient 204. The temporary ID may be associated with at least a portion of information from the recipient 204. For example, the temporary ID may be associated with a telephone number of the recipient when the recipient communicates with the host 206 via mobile telephone messaging (e.g., SMS, MMS, etc.). In some embodiments, the temporary ID may be associated with an existing account of the recipient, an internet protocol (IP) address, or other recipient information.

At 606, the host 206 may receive from the provider 202 a payment request that includes the temporary ID. For example, the recipient 204 may verbally communicate the temporary ID to the provider 202, who in turn may transmit the payment request and temporary ID to the host 206. In this way, the recipient 204 may receive a payment from the provider 202 without revealing personal and/or private information to the provider.

At 608, the host 206 may update accounts associated with the provider 202 and the recipient 204 to reflect the transfer of the payment in the process 600.

Figure 7:
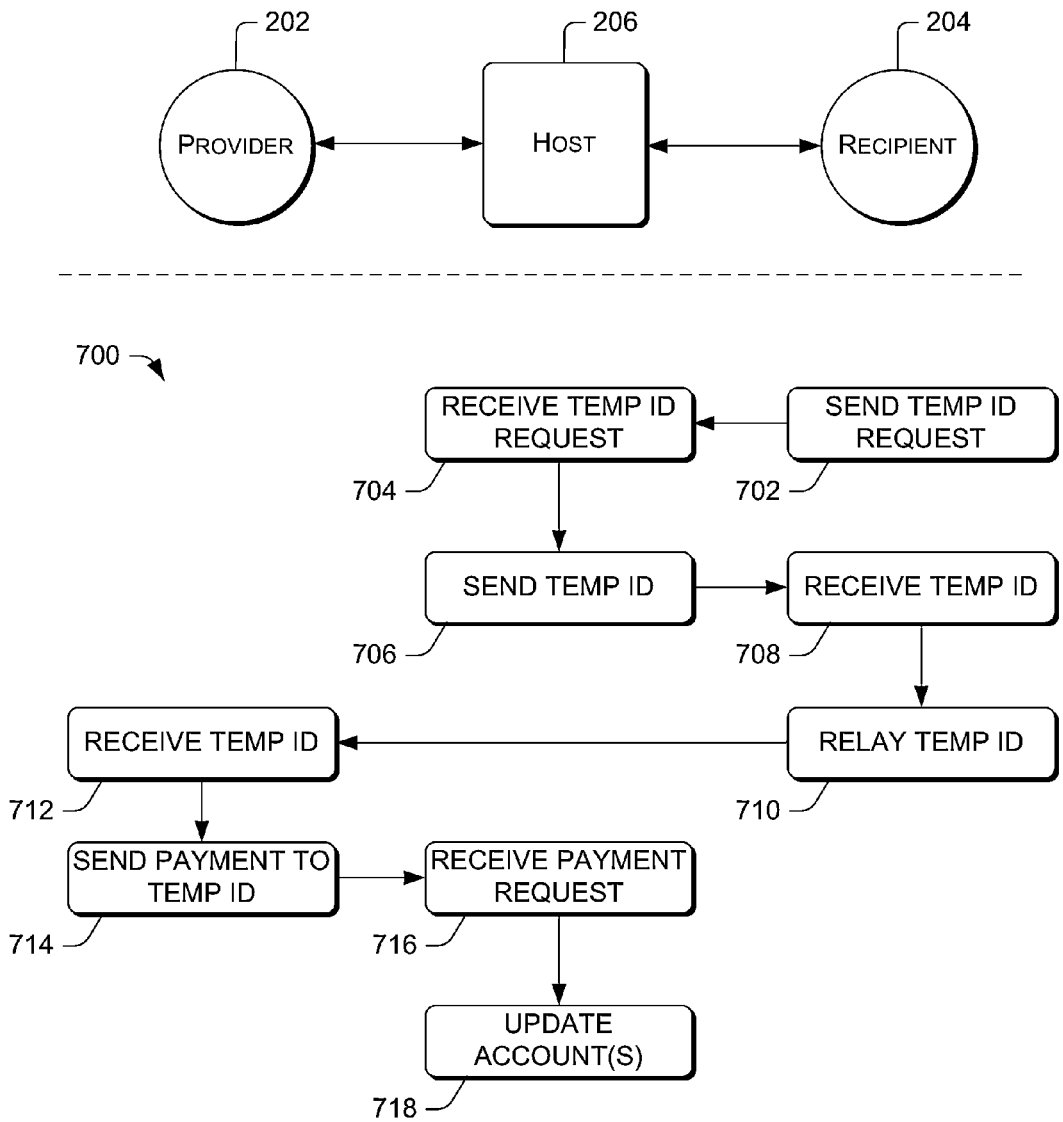
FIG. 7 is a flow diagram of an illustrative process to perform a recipient initiated anonymous mobile payment.

FIG. 7 is a flow diagram of an illustrative process to perform a recipient-initiated anonymous mobile payment in accordance with some embodiments of the disclosure. In the process 700, each operation is listed under an entity (the provider 202, the host 206, and/or the recipient 204) that is most likely to conduct the operation.

The recipient 204 may send a temporary ID request to the host 206 at 702, which is received by the host at 704. The host 206 may then obtain a temporary ID and send the temporary ID to the recipient 204 at 706, which is received by the recipient at 708. Next, the recipient 204 may relay the temporary ID to the provider 202 without exchanging personal or private information at 710.

The provider 202 may receive the temporary ID at 712. Next, the provider may send a payment request including the temporary ID to the host 206 at 714, which is received by the host 206 at 716. For example, the provider may send a SMS text message to the host such as "pay 50 temp_ID" where "pay" is a command to make a payment, "50" is the amount of the payment (e.g., dollars, credits, etc.), and "temp_ID" is the temporary ID that was sent to the recipient at the operation 706. Finally, at 718, the host 206 may update accounts associated with the provider 202 and the recipient 204 to reflect a transfer of a payment, as initiated in operation 702.

Figure 8:
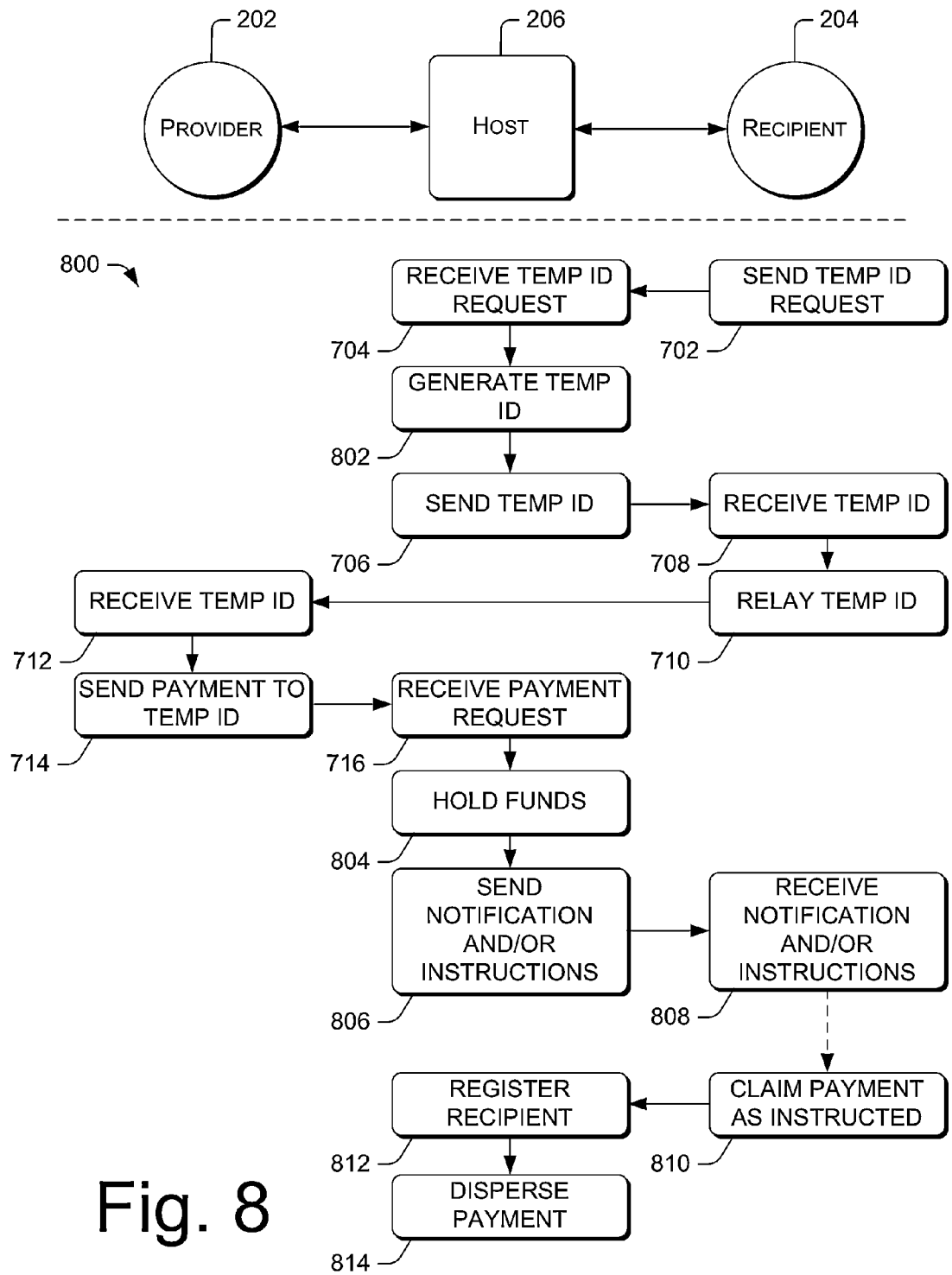
FIG. 8 is a flow diagram of another illustrative process to perform a recipient initiated anonymous mobile payment.

FIG. 8 is a flow diagram of another illustrative process 800 to perform a recipient initiated anonymous mobile payment in accordance with other embodiments of the disclosure. Some of the operations described in the process 700 are included in the process 800 (and shaded in FIG. 8) and may perform the same or similar operations as those described in reference to FIG. 7.

At 802, the host 206 may generate the temporary ID. In some embodiments, the host may generate the temporary ID using a combination of words and/or numbers, which is relatively easy to verbally communicate between the recipient and the provider. For example, words which may be spelled differently, but sound the same (e.g., too, to, two or buy, by, bye) may be avoided. In one or more embodiments, the recipient may request a particular temporary ID, or portion thereof. For example, the recipient may request a temporary ID with a command "temporary ID alleycat" where "temp ID" is a command to prompt the host 206 to create a temporary ID and "alleycat" is a requested temporary ID. If "alleycat" is available, the host may transmit a response at 706 such as "temp ID is alleycat." However, if the temporary ID of "alleycat" is unavailable, the host 206 may make a recommendation using at least a portion of the requested temporary ID, such as "alleycat23" and so forth, or the host may reject the temporary ID request. In further embodiments, the host may provide multiple temporary IDs to the recipient at 706, of which the recipient may choose a desired temporary ID during a selection process. In addition, at 802, the host 206 may associate the temporary ID with at least a portion of the recipient's information, such as a telephone number, email address, etc., thus making the temporary ID easy to remember without revealing enough personal information to lose recipient's anonymity.

At 804, the host 206 may place funds of the provider 202 on hold after receiving the payment request and temporary ID at 716. Next, the host 206 may send a notification of the payment to the recipient at 806. In addition or an alternative, the host 206 may send the recipient 204 instructions that assist the recipient in claiming the payment. For example, when the recipient 204 does not have an account, the recipient may have to create an account prior to receiving the payment from the host. In some instances, the payment may be associated with the recipient 204 via the payment request at 716 and generate temporary ID at 802, but the recipient does not have a distribution means until the host collects further information from the recipient, such as an address (e.g., for mailing a payment, etc.), a bank account (e.g., for electronic transfer of funds, etc.), or other accounts (e.g., mobile payment account, etc.) to enable receipt of the payment from the provider 202. At 808, the recipient receives the notification and/or instructions on how to claim the payment (e.g., SMS text message of instructions, etc.). At 810, the recipient 204 registers using the instructions to claim the payment. At 812, the host 206 may register the recipient to create an account, which may associate the temporary ID with at least one piece of user information, such as the recipient's mobile telephone number, information transmitted by the recipient to the host with the code, or other information unique to the recipient. In addition, at 510, the payment may be disassociated from the provider 202. In some embodiments, the funds may be placed in a temporary account associated with the recipient at 812. Finally, at 814, the payment is dispersed to the recipient.

Additional Anonymous Mobile Payment Embodiments

Figure 9:
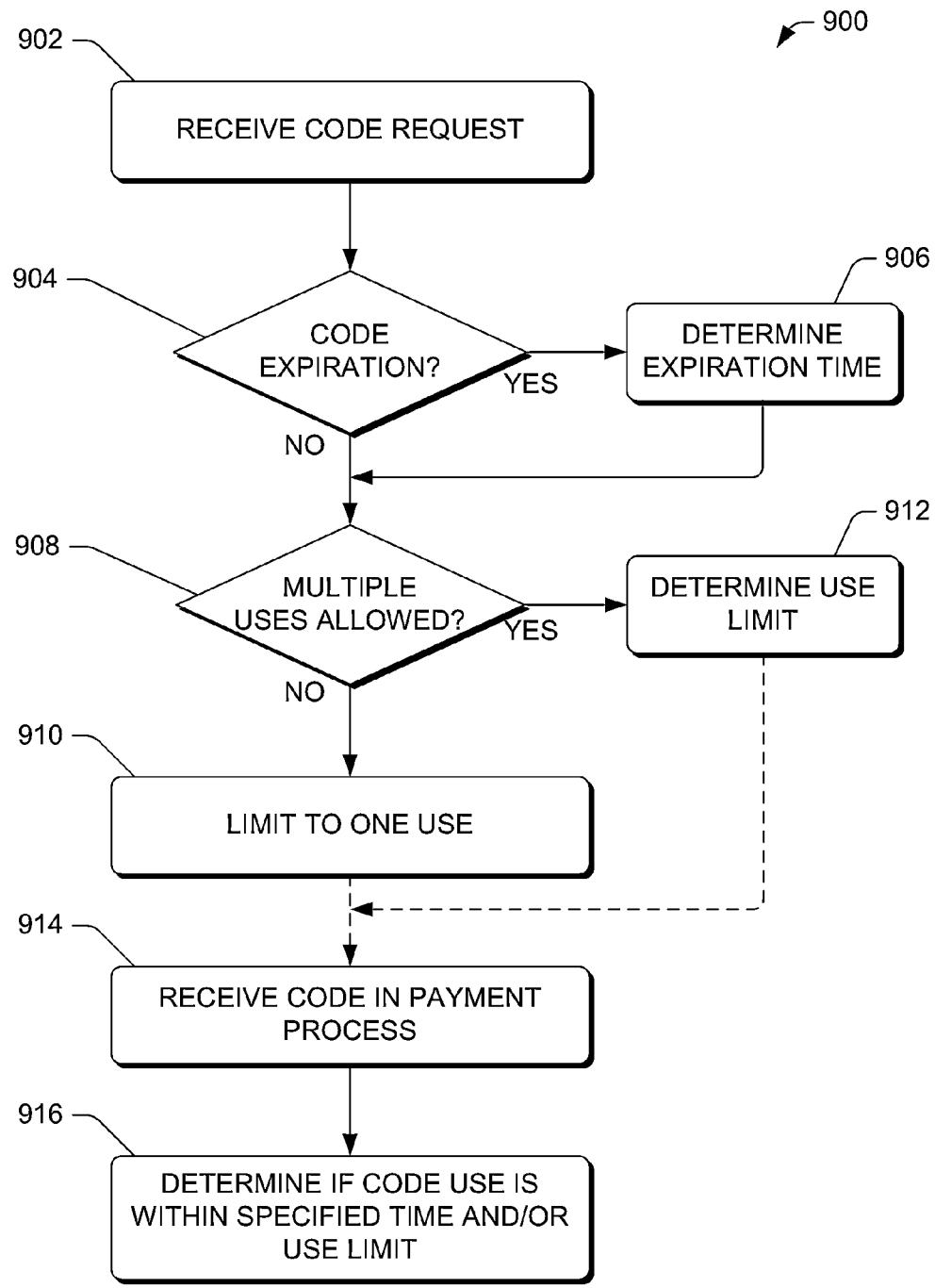
FIG. 9 is a flow diagram of an illustrative process to create redemption restrictions of an anonymous mobile payment.

FIG. 9 is a flow diagram of an illustrative process 900 to create redemption restrictions of an anonymous mobile payment in accordance with various embodiments of the disclosure. The redemption restrictions may include an expiration time and/or a use limit (e.g., redemption limit, etc.) for a code, which may be the temporary ID.

At 902, the host 206 may receive a request for a code, which may be similar to or identical to the operations 402, 702. In some embodiments, the code request may include additional information such as an expiration time and/or a quantity limit for redemptions. For example, the code request may include commands that enable the host 206 to recognize the restriction(s). One illustrative code using an SMS text message may include "pay 50 tempname for 1 day", where "for 1 day" is a command to create an expiration time.

At 904, the host 206 may determine whether the code has an expiration time. If the code has an expiration time, then the host determines the expiration time at 906. The expiration time may be communicated by an absolute time/date (e.g., noon on Jan. 12, 2011), a relative time (e.g., for 8 hours), or by other techniques for conveying an expiration time. When no code expiration exists at 904 or the expiration is determined at 906, the process 900 proceeds to an operation 908.

At 908, the host 206 may determine whether the code may be redeemed for multiple uses (e.g., redemptions, payments, etc.). For example, the provider 202 may receive a code at 410 (FIG. 4), which the provider 202 may desire to give to two different recipients, each capable of redeeming the code for the payment value specified at 402. In this instance, multiple (i.e., two) uses are desired by the provider. Multiple uses may be convenient for a provider to use to make reoccurring payments (e.g., allowance for kids, phone bill, etc.), for promotions (e.g., first 5 people to redeem in a promotion, etc.), and so forth. When multiple uses are not desired, the host 206 may set the use limit to one use at 910, which may be a default value for the use limit. When multiple uses are desired, the host may determine the use limit at 912. Upon completion of setting the use limit at 910 or 912, the process 900 proceeds to an operation 914.

At 914, the host 206 receives the code in a payment process, such as at operations 508, 714. At 916, the host determines whether the code use is within a specified time and/or use limit, as determined at the operations 904, 908. For example, if the code has an expiration time, and the expiration time has passed, then the payment funds may be returned to the provider 202 (which may be placed in hold from the operations 502, 804), etc. Similarly, if one use is determined at 910, then a temporary ID may be disassociated with the recipient after the payment is completed, and the temporary ID may then be used by another person at a later time. In further embodiments, additional restrictions may be placed on codes subjected to multiple uses to prevent a single recipient from redeeming the code multiple times. For example, the code redemption may be limited to one redemption for each unique telephone number or via other techniques to prevent multiple redemptions by a single recipient.

Figure 10:
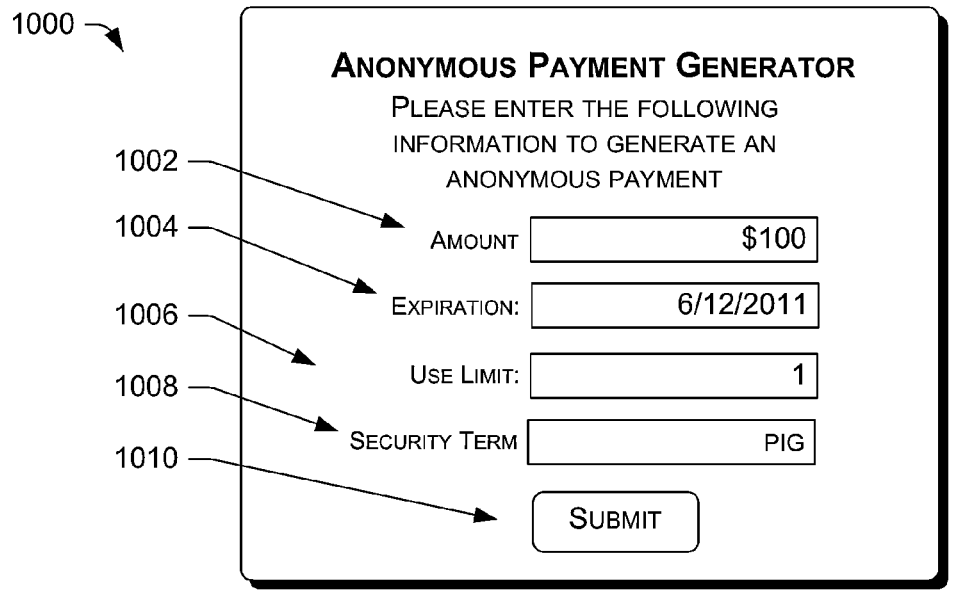
FIG. 10 is an illustrative user interface (UI) for use to generate an anonymous mobile payment.
Figure 11:
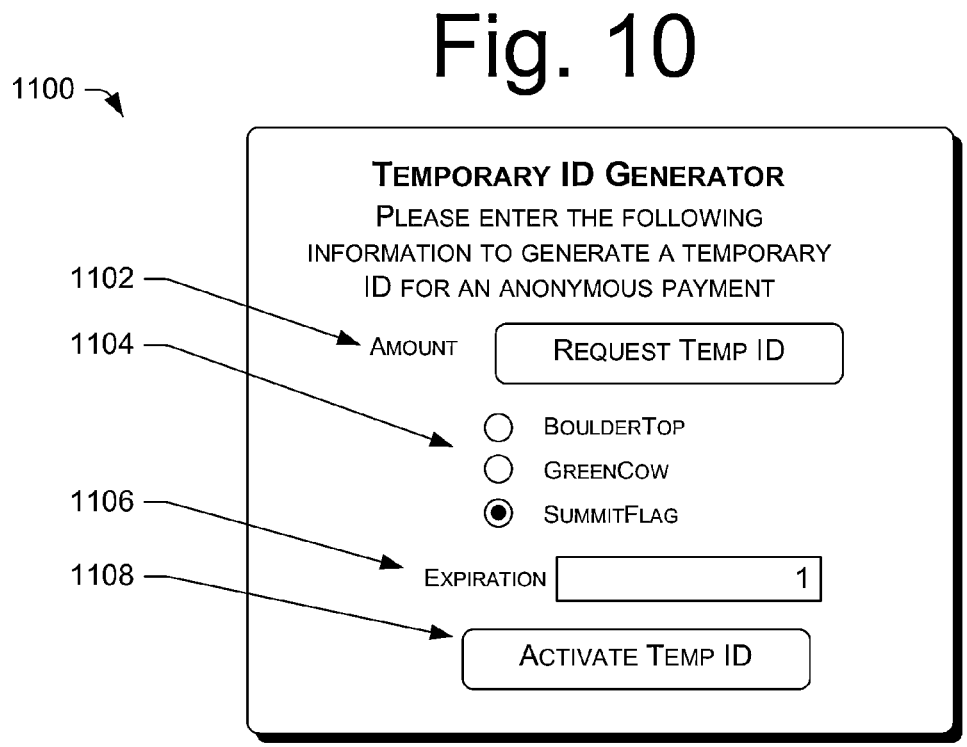
FIG. 11 is an illustrative UI for use to generate a temporary identifier for an anonymous mobile payment.
Figure 12:
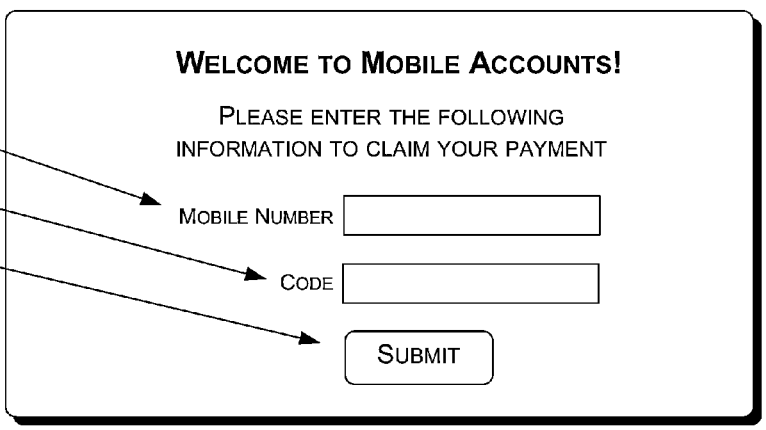
FIG. 12 is an illustrative UI for use to claim an anonymous mobile payment.

FIGS. 10-12 show illustrative user interfaces (UIs), which may be displayed on a mobile telephone, computer, or other electronic device, such as the client devices 104(1)-(N) of FIG. 1. For example, the UIs may be presented in one or more standalone mobile telephone applications that enable anonymous payments, among other types of payments. In addition, the UIs include various features that may be well suited for a customized UI, which will be described in more detail below. However, some or all of the functionality of the UIs may be achieved using text based messaging, such as SMS, MMS, etc.

FIG. 10 is an illustrative user interface (UI) 1000 for use to generate an anonymous mobile payment in accordance with one or more embodiments of the disclosure. The UI 1000 may facilitate generation of an anonymous payment, such as by the provider 202 using the process 300.

The UI 1000 may include a payment value field 1002, which may specify a payment value as an amount of currency, units, elements, etc. that are transferred as the payment. An expiration field 1004 may include an expiration time for the payment. The expiration time may be expressed at an absolute value (time and/or date) or a relative value (e.g., in 8 hours from submittal, etc.). A use limit field 1006 may enable input of a number of uses (e.g., redemptions, etc.) for a code. As described with reference to FIG. 9, the expiration field 1004 and the use limit field 1006 may be used in conjunction, in the alternative, or remain unused in an anonymous mobile payment.

The UI 1000 includes a security term field 1008 that may enable advanced security measures when generating a code. For example, the security term may be inputted by a provider as "pig". The host 206, in response to submitting the anonymous payment via the submit command 1010, may generate a code "blue dog 923". The recipient may then need to know both the security term and the code to redeem the payment, such as by sending the host a command including "blue dog 923 pig". In this way, the entire code is not transmitted in a single message, and thus the security and integrity of the code may be increased as compared to not submitting the security term.

FIG. 11 is an illustrative UI 1100 for use to generate a temporary identifier for an anonymous mobile payment in accordance with some embodiments of the disclosure. The UI 1100 may facilitate generation of an anonymous payment, such as by the recipient 204 using the process 600.

The UI 1100 may include a temporary ID command 1102 to request a temporary ID. In response to a user selection of the temporary ID command 1102, the host 206 may return one or more temporary IDs in an ID presentation section 1104. In various embodiments, the ID presentation section 1104 may be automatically populated when a user selects the UI 1100. The temporary ID command 1102 may repopulate the ID presentation section 1104 when the user desires to receive an additional selection of temporary IDs. In some embodiments, the recipient may choose a temporary ID from a list of temporary IDs displayed in the ID presentation section 1104. The temporary IDs may include an identifier formed of letters, words, numbers, symbols, or any combination thereof. In some embodiments, the temporary IDs may be simple word combinations that are relatively easy for a human to remember for a short period of time, thus making them easy to exchange verbally with another user (e.g., the provider 202, etc.).

In some embodiments, an expiration field 1106 may enable a user to select an expiration of the temporary ID, similar to the expiration field 1004. Finally, an activation command may enable the recipient 204 to activate the temporary ID. In further embodiments, a use limit field may be included in the UI 1100.

FIG. 12 is an illustrative UI 1200 usable by a recipient to claim an anonymous mobile payment in accordance with some embodiments of the disclosure. The UI 1200 may facilitate redemption of an anonymous payment, such as by the recipient 204 using the process 500. The UI 1200 may include a mobile telephone number field 1202 and a code field 1204. For example, the mobile number may be associated with the code when the recipient 204 registers the code, such as at the operation 510 shown in FIG. 5. In this way, the identity of the recipient is known by the host 206, but is not disclosed to the provider 202, thus creating an anonymous mobile payment. In some embodiments, information other than the mobile telephone number may be used in an association with the code. The recipient may select the submit command 1206 to claim the payment. In some embodiments, the recipient 204 may provide the code and telephone number to the host 206 via a text message, such as a SMS, MMS, etc., text message. In such instance, the host 206 may automatically detect the mobile telephone number from an SMS text message, thus the recipient may only have to send the code to the host.

Figure 13:
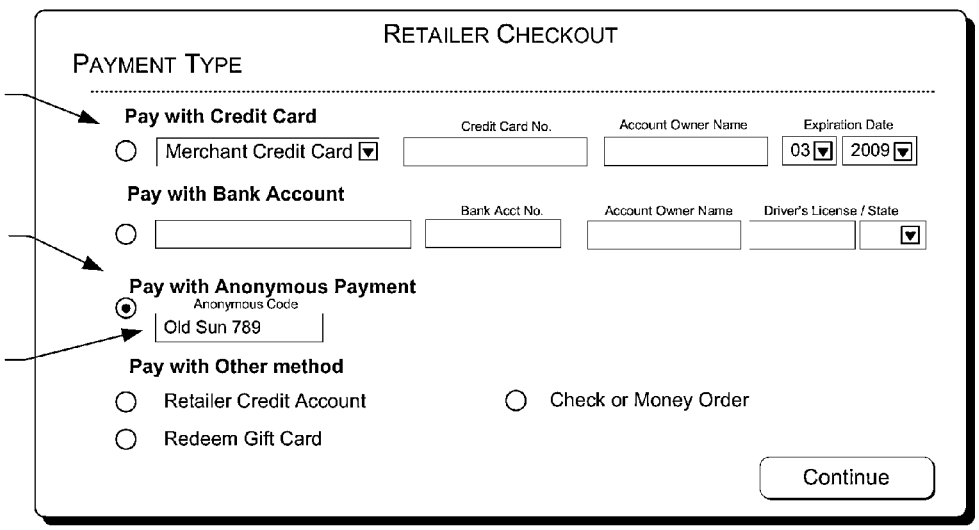
FIG. 13 is an illustrative UI for use to provide an anonymous mobile payment to a merchant.

FIG. 13 is an illustrative UI 1300 for use to provide an anonymous mobile payment to a merchant in accordance with various embodiments of the disclosure. For example, a user may be presented with the UI 1300 at a checkout page of a merchant (online or in person, etc.). The UI 1300 may include traditional payment types 1302 that are linked to the identity of the provider (e.g., customer making the payment). In accordance with one or more embodiments, an anonymous payment section 1304 may be presented in the UI 1300 to enable the provider 202 to make an anonymous mobile payment. The anonymous payment section 1304 may include a code field 1306. In operation, the provider may request a code via the process 400, operations 402-410. The operation 412 may include inputting the requested information in the UI 1300. In some embodiments, the retailer may verify the code is correct when the amount associated with the code (payment value) is equal to the total due at the checkout of the merchant. Finally, the provider may complete the payment using the continue command 1308.

Illustrative Computing System

Figure 14:
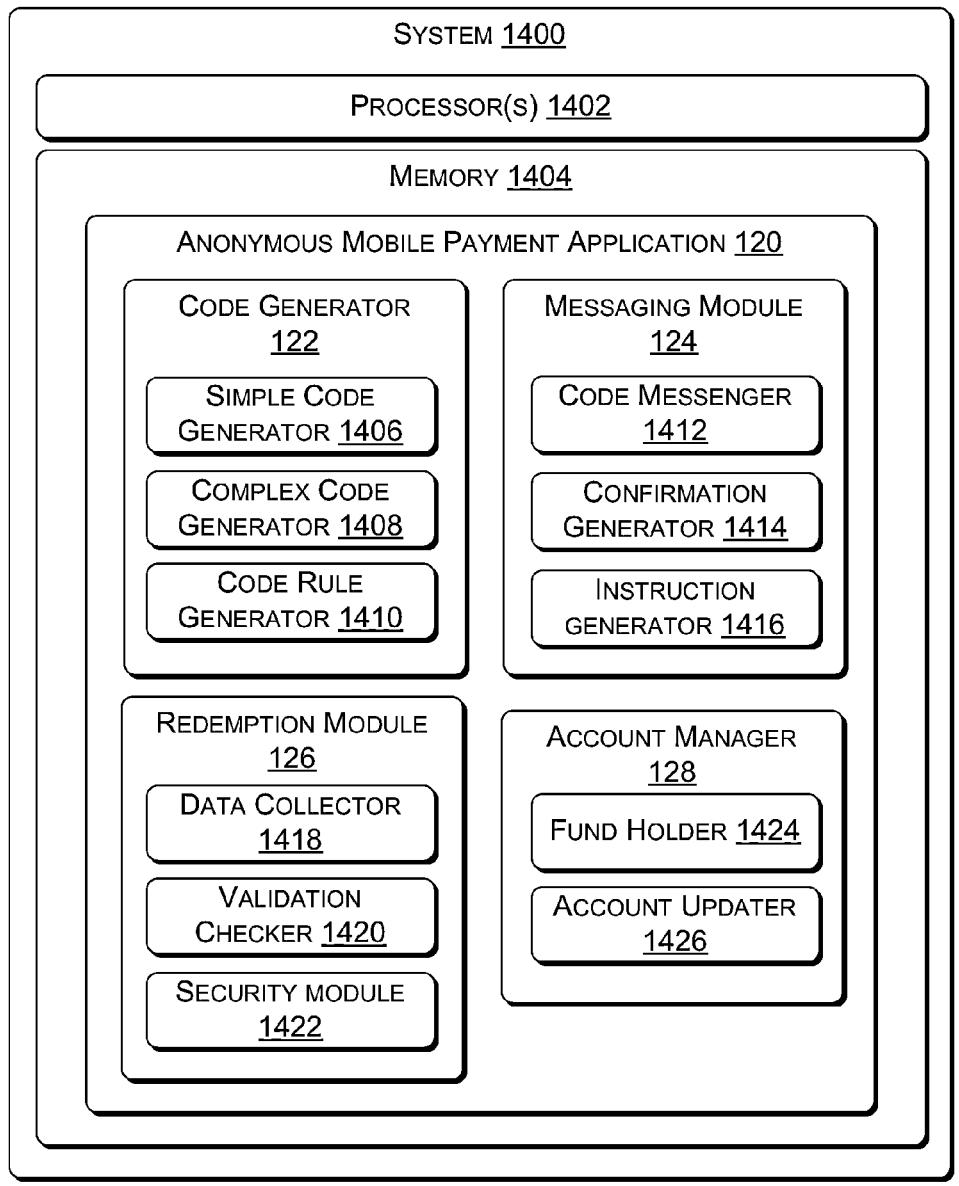
FIG. 14 is a block diagram of an illustrative computing system showing one or more embodiments of components associated with the illustrative computing environment of FIG. 1.

FIG. 14 is a block diagram of an illustrative computing system 1400 showing one or more embodiments of components associated with the illustrative computing environment of FIG. 1. The system 1400 may include one or more processors 1402 which may execute computer instructions stored in memory 1404. The memory 1404 may include the anonymous mobile payment application 120, as described in FIG. 1, which may further include the code generator 122, the messaging module 124, the redemption module 126, and the account module 128, each described in turn.

The code generator 122 may include additional modules that facilitate generating a code (or temporary ID) as disclosed herein. A simple code generator 1406 may be used to create a simple code, such as a temporary ID, which does not require additional security measures because the code is not intended to be used to transmit a payment without other associated data. A complex code generator 1408 may be used to create a code, such as the code generated at the operation 504 of FIG. 5, which includes security measures to prevent theft of the code (e.g., guessing the code, etc.). A code rule generator 1410 may be used to assign rules (e.g., expiration, use quantity, etc.) to the code.

The messaging module 124 may include additional modules that facilitate messaging of anonymous payments. A code messenger 1412 may be used to transmit one or more messages between the host 206 and a user (the provider 202 and/or the recipient 204) to establish the code. A confirmation generator 1414 may enable the recipient 204 to verify that a code is valid once the code is redeemed. For example, at the operations 512-514, the confirmation generator may confirm the code has been properly associated with the recipient. An instruction generator 1416 may create and distribute instructions at the operations 512-514 along with or separate from the confirmation.

The redemption module 126 may include additional modules that facilitate redemption of the code as disclosed herein. A data collector 1418 may be used to collect information from the recipient 204 when he/she redeems the code and/or registers an account to facilitate obtaining the payment. For example, in the operation 516 shown in FIG. 5, the recipient 204 may provide private and/or personal information to the host 206, which is not accessible by the provider 202, thus enabling the anonymous mobile payment. A validation checker 1420 may determine whether the code used in for redemption is valid, such as in the operation 916 shown in FIG. 9, which may validate against the expiration time, use limit, or other code rules implemented by the code rule generator 1410. A security module 1422 may be used to protect the code from misuse, fraudulent redemption, or other undesirable actions. For example, the host 106 may include the security module 1422 that limits the number or frequency of entering codes for redemption, or takes other anti-spoofing precautions to deter or prevent fraudulent activities involving the anonymous mobile payment system. In another example, the security module 1422 may implement a delay period for the host 206 prior to receiving the redemption code when the redemption code is not a correct redemption code in a previous receipt of the redemption code from the recipient 204.

The account module 128 may include additional modules that facilitate account management as disclosed herein. A fund holder 1424 may place funds on hold when a code is generated for a payment. For example, at 502 shown in FIG. 5, the fund holder 1424 may prevent the provider 202 from accessing funds which are associated with a payment request until the code has expired or is otherwise no longer active. An account updater 1426 may update mobile payment accounts associated with the provider 202 and/or the recipient 204, such as the user accounts 210 shown in FIG. 2 after a transfer of a payment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, at a payment server, a temporary identifier request from at least one device associated with a payment recipient, the temporary identifier request being associated with at least one piece of information that identifies the payment recipient;
   selecting a temporary identifier from a list of available identifiers, the selected temporary identifier usable to enable a payment provider to route an anonymous payment from the payment provider to the payment recipient without an exchange of personal information between the payment provider and the payment recipient;
   associating the selected temporary identifier with the at least one piece of information;
   sending the selected temporary identifier to the at least one device associated with the payment recipient;
   receiving a payment request from at least one other device associated with the payment provider, the payment request including at least a payment amount and the selected temporary identifier; and
   causing, based at least in part on the association between the selected temporary identifier and the at least one piece of information, a transfer of the payment amount from an account associated with the payment provider to an account associated with the selected temporary identifier.

2. The computer-implemented method as recited in claim 1, wherein the at least one piece of information comprises at least one of a telephone number, an email, an alias, or a mobile device identifier.

3. The computer-implemented method as recited in claim 1, wherein the causing the transfer of the payment amount from the account associated with the payment provider to the account associated with the selected temporary identifier comprises causing a transfer of the payment amount to a preexisting account that is associated with the payment recipient.

4. The computer-implemented method as recited in claim 1, further comprising:
   registering the payment recipient by collecting the at least one piece of information;
   creating a payment receiving account associated with the payment recipient; and
   depositing the payment amount into the payment receiving account from the account associated with the selected temporary identifier.

5. The computer-implemented method as recited in claim 1, wherein the temporary identifier request from the at least one device associated with the payment recipient includes a suggested temporary identifier, and wherein selecting the temporary identifier includes searching the list of available identifiers using at least a portion of the suggested temporary identifier.

6. The computer-implemented method as recited in claim 1, further comprising:
   transmitting the list of available identifiers to the at least one device associated with the payment recipient; and
   receiving a selection made from the list of available identifiers, wherein the selected temporary identifier is based on the received selection.

7. A computer-implemented method comprising:
   receiving, at one or more servers hosting a payment service, a temporary identifier request from at least one device associated with a payment recipient;
   generating, at least one server of the one or more servers, a temporary identifier for the payment recipient, the generated temporary identifier usable to enable a transfer of a payment;
   sending the temporary identifier to the at least one device associated with the payment recipient;
   receiving a payment request from at least one other device associated with a payment provider, the payment request including at least a payment amount and the temporary identifier; and
   causing the payment amount to be transferred from an account associated with the payment provider to an account associated with the payment recipient.

8. The computer-implemented method as recited in claim 7, further comprising associating the temporary identifier with at least one piece of information that identifies the payment recipient, the at least one piece of information including at least one of a telephone number, an email, an alias, or a mobile device identifier.

9. The computer-implemented method as recited in claim 7, further comprising:
   after receiving the payment request, reserving the payment amount in the account associated with the payment provider as unavailable to the payment provider;
   sending a notification to the at least one device associated with the payment recipient, the notification including instructions to claim the payment amount; and
   receiving information from the at least one device associated with the payment recipient to claim the payment amount.

10. The computer-implemented method as recited in claim 7, wherein:
    the temporary identifier has an expiration time; and
    the causing the payment amount to be transferred from the account associated with the payment provider to the account associated with the payment recipient occurs after the payment request is received and before the expiration time expires.

11. The computer-implemented method as recited in claim 7, wherein the temporary identifier includes a unique combination of one or more words and a number, wherein at least one word of the one or more words or the number conveys an unidentifiable portion of payment recipient information so that the payment recipient remains anonymous.

12. The computer-implemented method as recited in claim 7, wherein the temporary identifier is usable to enable the transferring of the payment amount at the one or more servers after the payment recipient shares the temporary identifier with the payment provider.

13. The computer-implemented method as recited in claim 7, wherein the temporary identifier is usable to enable the transferring of the payment amount without an exchange of personal information between the payment provider and the payment recipient.

14. One or more non-transitory computer-readable media storing instructions that, when executed on one or more processors, configure one or more devices to:
 obtain a unique code that provides access to a payment in response to receiving a temporary identifier request from at least one device associated with a recipient of the payment;
 and
 causing a transfer of the payment from an account associated with a provider of the payment to an account associated with the recipient of the payment after:
  the unique code is sent to the at least one device associated with the recipient of the payment; and
  a payment request that includes the unique code is received from at least one other device associated with the provider of the payment.

15. The one or more non-transitory computer-readable media as recited in claim 14, wherein the obtaining the unique code includes:
 selecting the unique code from a list of available codes; and
 associating the selected unique code with at least one piece of personal information of the recipient of the payment.

16. The one or more non-transitory computer-readable media as recited in claim 14, wherein the obtaining the unique code includes generating the unique code based in part on at least one piece of personal information of the recipient of the payment.

17. The one or more non-transitory computer-readable media as recited in claim 14, wherein the recipient of the payment comprises a merchant and the provider of the payment comprises a purchaser of an item or a service offered for acquisition by the merchant.

18. The one or more non-transitory computer-readable media as recited in claim 14, wherein the unique code includes a combination of one or more words and a number and at least one word of the one or more words or the number conveys an unidentifiable portion of personal information so that the recipient of the payment remains anonymous.

19. The one or more non-transitory computer-readable media as recited in claim 14, wherein the unique code is usable to enable a transfer of the payment after the recipient of the payment shares the unique code with the provider of the payment.

20. The one or more non-transitory computer-readable media as recited in claim 14, wherein:
 the unique code has an expiration time; and
 the causing the transfer of the payment from the account associated with the provider of the payment to the account associated with the recipient of the payment occurs after the payment request is received and before the expiration time expires.

\* \* \* \* \*